US007684886B2

(12) United States Patent
Sullivan et al.

(10) Patent No.: US 7,684,886 B2
(45) Date of Patent: Mar. 23, 2010

(54) METHOD AND SYSTEM FOR MANAGING AND VALIDATING PRODUCT DEVELOPMENT

(75) Inventors: Andrew Donald Sullivan, Morton, IL (US); Thomas Gerard Muir, Edwards, IL (US); Brian John Hoehne, Dunlap, IL (US); Franklin Harrison Henninger, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 220 days.

(21) Appl. No.: 11/896,395

(22) Filed: Aug. 31, 2007

(65) Prior Publication Data

US 2009/0062952 A1   Mar. 5, 2009

(51) Int. Cl.
*G06F 19/00* (2006.01)
*G06F 12/00* (2006.01)
*G06F 17/30* (2006.01)
*G06F 9/44* (2006.01)

(52) U.S. Cl. .................. 700/97; 700/98; 700/105; 707/203; 717/100; 717/170

(58) Field of Classification Search ............. 700/97–98, 700/105; 707/203; 717/100, 170
See application file for complete search history.

(56) References Cited

U.S. PATENT DOCUMENTS

| | | | |
|---|---|---|---|
| 5,604,892 A | | 2/1997 | Nuttall et al. |
| 5,864,480 A | * | 1/1999 | Ladd .......................... 700/83 |
| 6,138,104 A | * | 10/2000 | Marchak et al. ................ 705/9 |
| 6,430,455 B1 | * | 8/2002 | Rebello et al. .............. 700/105 |
| 6,522,939 B1 | | 2/2003 | Strauch et al. |
| 6,801,822 B1 | | 10/2004 | Fujiwara et al. |
| 6,839,719 B2 | | 1/2005 | Wallace |
| 6,862,585 B2 | * | 3/2005 | Planalp et al. ................. 707/1 |
| 6,895,291 B2 | * | 5/2005 | Arnaud et al. ................ 700/97 |
| 6,915,172 B2 | | 7/2005 | Parent et al. |
| 6,928,412 B2 | | 8/2005 | DeBiasse |
| 7,024,262 B2 | | 4/2006 | Yokota et al. |
| 2003/0055659 A1 | * | 3/2003 | Alling ........................... 705/1 |
| 2003/0055674 A1 | * | 3/2003 | Nishiyama ..................... 705/1 |
| 2003/0069659 A1 | * | 4/2003 | Wada et al. .................. 700/108 |
| 2004/0078387 A1 | | 4/2004 | Benjamin et al. |
| 2005/0096951 A1 | * | 5/2005 | Ye et al. ......................... 705/7 |
| 2006/0052892 A1 | * | 3/2006 | Matsushima et al. .......... 700/98 |
| 2006/0106475 A1 | * | 5/2006 | Mancuso et al. .............. 700/97 |
| 2006/0173726 A1 | | 8/2006 | Hall et al. |
| 2007/0016550 A1 | | 1/2007 | Oodake |
| 2007/0079651 A1 | | 4/2007 | Denkmayr |
| 2009/0037869 A1 | * | 2/2009 | Hamilton et al. ............ 717/100 |

\* cited by examiner

*Primary Examiner*—Ramesh B Patel
(74) *Attorney, Agent, or Firm*—Finnegan, Henderson, Farabow, Garrett & Dunner (57) ABSTRACT

A method is provided for managing and validating product development. The method may include obtaining a product specification for a product and identifying prior products that have capabilities within a defined range of the product specifications. The method may also include developing a performance specification based on the product specification and the identified prior products. Further, the method may include obtaining approval for the performance specification, developing the product according to the performance specification, and validating that the product meets the performance specification.

20 Claims, 5 Drawing Sheets

| Field | Value | Key |
|---|---|---|
| TERM | VEHICLE – TIRE PRESSURE | |
| SOURCE | MEASURED | 206 |
| CONDITION | STEEP INCLINE | 7 |
| UNIT OF MEASURE | KILOPASCALS (GAGE) | 63 |
| FORM | AVERAGE | 16 |
| INDEX | LEFT FRONT | 2 |
| QUALIFIED DEFINITION | FACILITY VEHICLE TIRE PRESSURE ON LEFT .... | |
| COMMENT | MEASURE VEHICLE TIRE PRESSURE USING ... | |

[CONTINUE] [CANCEL]

FIG. 5

METHOD AND SYSTEM FOR MANAGING AND VALIDATING PRODUCT DEVELOPMENT

TECHNICAL FIELD

This disclosure relates generally to product development, and, more particularly, to methods and systems for managing and validating product development.

BACKGROUND

Many companies develop products that meet the particular needs of a customer. Smaller companies may have a team of engineers that work together closely and can rely on their past experience to determine whether a previously created product can be re-used for each customer. Larger companies, however, may have many engineers working in multiple offices and multiple countries. For these larger companies, tracking and managing previously created products becomes difficult. Some engineers will store product information and test results in spreadsheets, others might use a word processing program, and still others may rely on handwritten notes or their memory. Because the products and product specifications are not available in a common format, engineers may re-create a product that the company has already developed. This can lead to increased costs and delays in the manufacturing process.

One tool that has been developed for managing product development is U.S. Pat. No. 6,862,585 to Planalp et al. (the '585 patent). The '585 patent describes a system and method for managing product development using a relational database. The database includes design requirements of a finished product, electronic tracking of changes to a product during development, and archiving of previous versions of a product for subsequent access.

Although the tool of the '585 patent provides a database for archiving previous products, the '585 patent only allows searching for exact copies of previously developed products. If a customer requests a product that does not exactly match a previously developed product, the requested product must be developed. However, other products may have been developed that would meet the needs of the customer. Indeed, customers may prefer to modify a previously developed product, which would reduce costs and allow earlier delivery compared to creating an entirely new product. Moreover, the '585 patent does not provide a standard database for terms, which can cause an engineer to be unable to find a previously created product when other engineers describe the product using different terminology. As a result, engineers would re-design and re-develop the product, leading to delays and increased costs.

The present disclosure is directed to overcoming one or more of the problems set forth above.

SUMMARY OF THE INVENTION

In accordance with one aspect, the present disclosure is directed toward a computer-readable medium comprising instructions which, when executed by a processor, perform a method for managing and validating product development. The method may include obtaining a product specification for a product and identifying prior products that have capabilities within a defined range of the product specifications. The method may also include developing a performance specification based on the product specification and the identified prior products. Further, the method may include obtaining approval for the performance specification, developing the product according to the performance specification, and validating that the product meets the performance specification.

According to another aspect, the present disclosure is directed toward a method for managing and validating product development. The method may include obtaining a product specification for a product and identifying prior products that have capabilities within a defined range of the product specifications. The method may also include developing a performance specification based on the product specification and the identified prior products. Further, the method may include obtaining approval for the performance specification, developing the product according to the performance specification, and validating that the product meets the performance specification.

According to another aspect, the present disclosure is directed to a computer system including memory, at least one input device, and a central processing unit in communication with the memory and the at least one input device. The central processing unit may obtain a product specification for a product and identify prior products that have capabilities within a defined range of the product specifications. The central processing unit may also develop a performance specification based on the product specification and the identified prior products. Further, the central processing unit may obtain approval for the performance specification, develop the product according to the performance specification, and validate that the product meets the performance specification.

DETAILED DESCRIPTION

Reference will now be made in detail to exemplary embodiments, which are illustrated in the accompanying drawings. Wherever possible, the same reference numbers will be used throughput the drawings to refer to the same or like parts.

Figure 1:
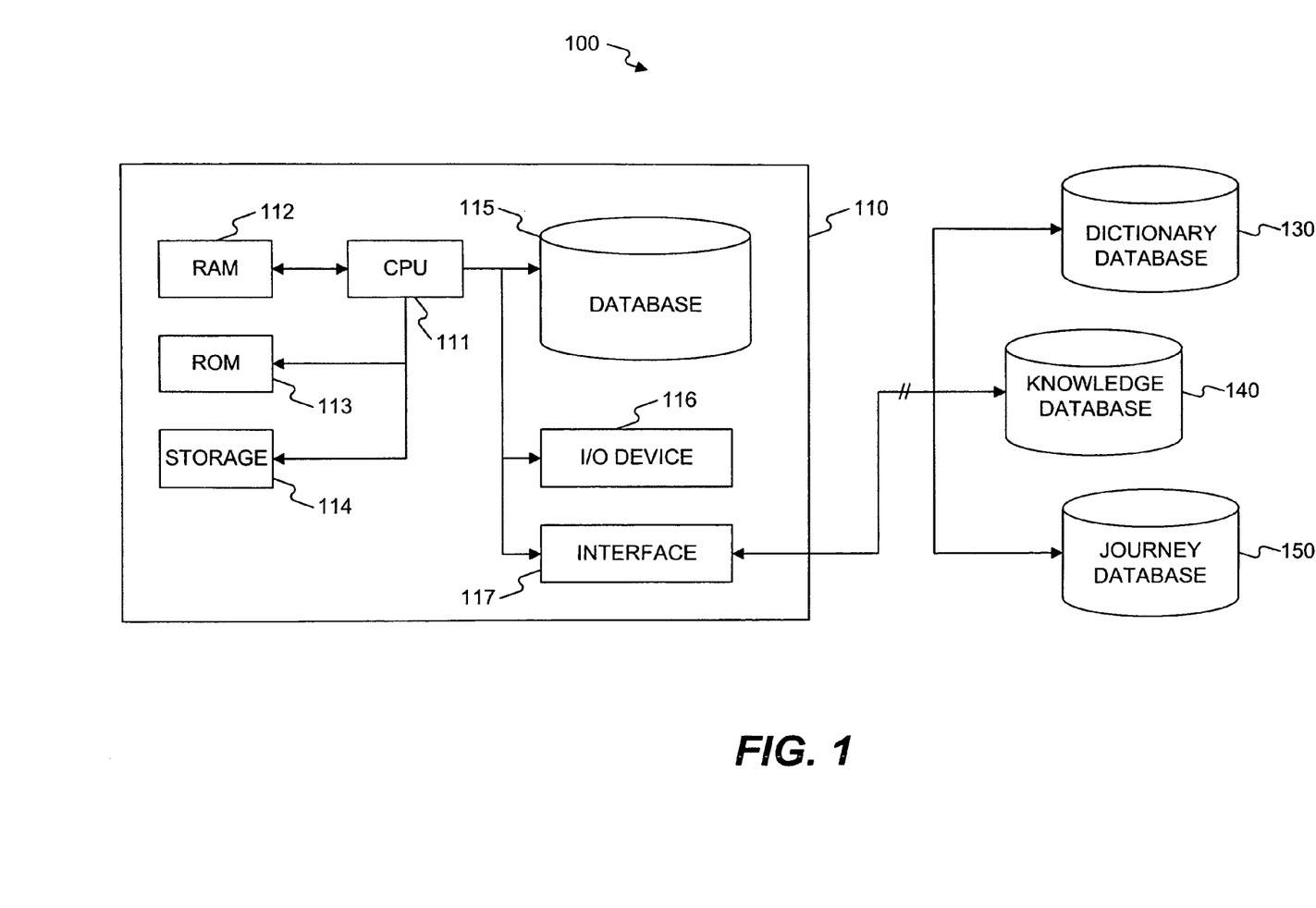
FIG. 1 is a block illustration of an exemplary disclosed system for managing and validating product development using a data dictionary.

FIG. 1 provides a block diagram illustrating an exemplary environment 100 for managing and validating product development using a data dictionary. Environment 100 may include a system 110 and one or more databases 130, 140, and 150. System 110 may be, for example, a general purpose personal computer or a server. Although illustrated as a single system 110, a plurality of systems 110 may connect to other systems, to a centralized server, or to a plurality of distributed servers using, for example, wired or wireless communication.

System 110 may include any type of processor-based system on which processes and methods consistent with the disclosed embodiments may be implemented. For example, as illustrated in FIG. 1, system 110 may include one or more hardware and/or software components configured to execute software programs. System 110 may include one or more hardware components such as a central processing unit (CPU) 111, a random access memory (RAM) module 112, a read-only memory (ROM) module 113, a storage 114, a database 115, one or more input/output (I/O) devices 116, and an interface 117. System 110 may include one or more software components such as a computer-readable medium including computer-executable instructions for performing methods consistent with certain disclosed embodiments. One or more of the hardware components listed above may be implemented using software. For example, storage 114 may include a software partition associated with one or more other hardware components of system 110. System 110 may include additional, fewer, and/or different components than those listed above, as the components listed above are exemplary only and not intended to be limiting.

CPU 111 may include one or more processors, each configured to execute instructions and process data to perform one or more functions associated with system 110. As illustrated in FIG. 1, CPU 111 may be communicatively coupled to RAM 112, ROM 113, storage 114, database 115, I/O devices 116, and interface 117. CPU 111 may execute sequences of computer program instructions to perform various processes, which will be described in detail below. The computer program instructions may be loaded into RAM for execution by CPU 111.

RAM 112 and ROM 113 may each include one or more devices for storing information associated with an operation of system 110 and CPU 111. RAM 112 may include a memory device for storing data associated with one or more operations of CPU 111. For example, ROM 113 may load instructions into RAM 112 for execution by CPU 111. ROM 113 may include a memory device configured to access and store information associated with system 110, including information for managing and validating product development using a data dictionary.

Storage 114 may include any type of mass storage device configured to store information that CPU 111 may need to perform processes consistent with the disclosed embodiments. For example, storage 114 may include one or more magnetic and/or optical disk devices, such as hard drives, CD-ROMs, DVD-ROMs, or any other type of mass media device.

Database 115 may include one or more software and/or hardware components that cooperate to store, organize, sort, filter, and/or arrange data used by system 110 and CPU 111. Database 115 may store data collected by system 110 to monitor and validate product development using a data dictionary. For example, database 115 may store a local copy of a data dictionary, a product specification developed by a customer, test results for simulating a product configuration to determine if the configuration satisfies the product specification, and information regarding prior products that have been developed.

I/O device 116 may include one or more components configured to communicate information to a user associated with system 110. For example, I/O devices may include a console with an integrated keyboard and mouse to allow a user to input parameters associated with system 110. I/O device 116 may also include a display, such as a monitor, including a graphical user interface (GUI) for outputting information. I/O devices 116 may also include peripheral devices such as, for example, a printer for printing information and reports associated with system 110, a user-accessible disk drive (e.g., a USB port, a floppy, CD-ROM, or DVD-ROM drive, etc.) to allow a user to input data stored on a portable media device, a microphone, a speaker system, or any other suitable type of interface device.

The results of received data may be provided as an output from system 110 to I/O device 116 for printed display, viewing, and/or further communication to other system devices. Output from system 110 may also be provided to database 115 and to dictionary database 130, knowledge database 140, and journey database 150, as described below.

Interface 117 may include one or more components configured to transmit and receive data via a communication network, such as the Internet, a local area network, a workstation peer-to-peer network, a direct link network, a wireless network, or any other suitable communication platform. In this manner, system 110 may communicate with other network devices, such as dictionary database 130, through the use of a network architecture (not shown). In such an embodiment, the network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. For example, interface 117 may include one or more modulators, demodulators, multiplexers, demultiplexers, network communication devices, wireless devices, antennas, modems, and any other type of device configured to enable data communication via a communication network.

Dictionary database 130 may store a standardized database for terms, such as engineering terms. Dictionary database 130 may be arranged in a matrix structure to reduce redundant storage, and may include a hierarchy with one or more tiers. For example, dictionary database 130 may include a first tier with a descriptor of a broad product-level definition of a term, a second tier with a context-specific definition, and a third tier with a process term definition, as described in more detail below. Using a tiered approach allows a general user to refer to different terms with standardized definitions including, for example, measurements and calculations.

Knowledge database 140 may be a first database for storing electronic contracts relating to product development. For example, knowledge database 140 may store product specifications that a customer requested, a technical summary for a product based on the product specifications, and a performance contract based on revised product specifications. Product specifications from a customer may be revised to utilize a previously created product, as described in more detail below. Knowledge database 140 may store revisions to the electronic contract between a customer and a manufacturer. For example, knowledge database 140 may store a comparison between the requested product specifications and the actual specifications that an existing product may achieve. The comparison may include the results of one or more simulations or actual testing of products. A customer may use the comparison to determine if the existing product is adequate for their needs, or if a new product needs to be developed.

Journey database 150 may be a second database for storing technical details of simulations and tests. For example, if a manufacturer tests an existing engine for durability in a desert environment, journey database 150 may store the barometric pressure, relative humidity, temperature, duration of test, the engineer who performed the test, the location of the test, and other information related to the simulation or test. System 110 may use the technical details of simulations and tests to determine how readily adaptable a product is to a new application. For example, an engine developed for a desert environment, such as in a military vehicle, may require modification to be applied in a marine application, such as in a power boat. By analyzing the technical details of simulations and tests, engineers may determine how much modification may be required to a product and whether further testing and simulation is required.

Although not illustrated, one or more servers may contain dictionary database 130, knowledge database 140, and journey database 150. In this manner, a server may collect data from a plurality of systems 110 to provide a central repository for product management and development. Moreover, one or more of dictionary database 130, knowledge database 140, and journey database 150 may be combined into a single database. Examples of collecting data, managing and validating products, and developing a data dictionary will be described below with reference to FIGS. 2-4.

Those skilled in the art will appreciate that all or part of systems and methods consistent with the present disclosure may be stored on or read from other computer-readable media. Environment 100 may include a computer-readable medium having stored thereon machine executable instructions for performing, among other things, the methods disclosed herein. Exemplary computer readable media may include secondary storage devices, like hard disks, floppy disks, and CD-ROM; or other forms of computer-readable memory, such as read-only memory (ROM) 113 or random-access memory (RAM) 112. Such computer-readable media may be embodied by one or more components of environment 100, such as CPU 111, storage 1113, database 115, dictionary database 130, knowledge database 140, and journey database 150, or combinations of these and other components.

Furthermore, one skilled in the art will also realize that the processes illustrated in this description may be implemented in a variety of ways and include other modules, programs, applications, scripts, processes, threads, or code sections that may all functionally interrelate with each other to provide the functionality described above for each module, script, and daemon. For example, these programs modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose.

The described implementation may include a particular network configuration but embodiments of the present disclosure may be implemented in a variety of data communication network environments using software, hardware, or a combination of hardware and software to provide the processing functions.

Processes and methods consistent with the disclosed embodiments may manage and validate product development using a data dictionary that defines terms based on attributes of the term and that supports multiple languages. Customers can view comparisons between their desired product specifications and performance characteristics of existing products. Terminology in contracts and comparisons, including the results of tests and simulations, can be standardized. As a result, engineers, marketing personnel, customers, and consumers may communicate in a manner that allows indexing and searching of products for use in product development and validation.

Exemplary processes, methods, and user interfaces consistent with the invention will now be described with reference to FIGS. 2-4.

INDUSTRIAL APPLICABILITY

The disclosed methods and systems provide a desired solution for managing and validating product development. Customers and manufacturers can track the progress of product development using electronic contracts to compare desired product capabilities to existing products. Moreover, a data dictionary may define a plurality of engineering terms related to product development to allow searching of previously created products and their technical specifications. The data dictionary may define terms by standardizing units and calculations used to describe the terms. Accordingly, environment 100 may allow an engineer to determine if a product has already been created that will meet a customer's product specifications. Identifying previously created products allows an engineer to re-use products in different product configurations, reducing the time and cost of manufacturing a new product.

Figure 2:
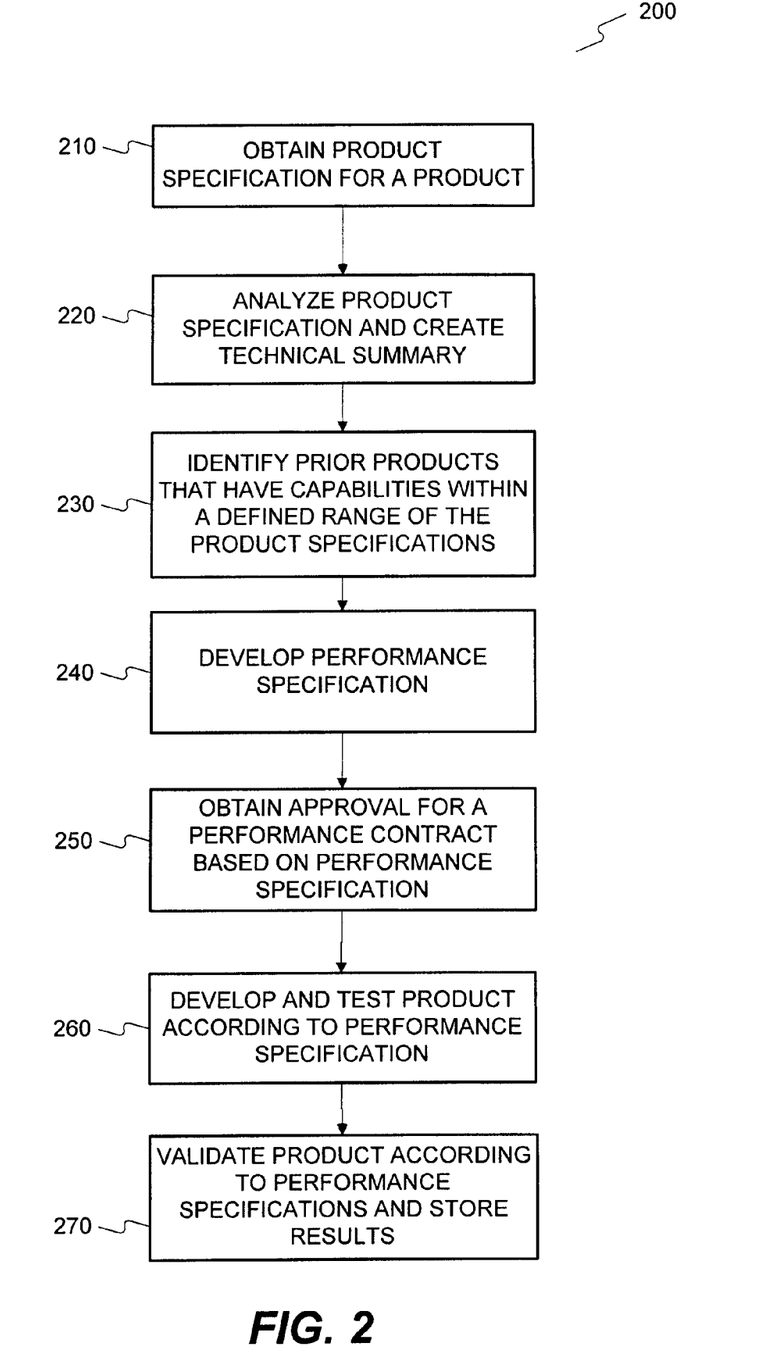
FIG. 2 is a flowchart illustration of an exemplary disclosed method for managing and validating product development.

FIG. 2 illustrates an exemplary disclosed method 200 for managing and validating product development. Method 200 may begin with system 110 obtaining a product specification for a product (Step 210). The product specification may include desired capabilities of a new product, or modifications to an existing product. The capabilities may be, for example, technical objectives that the product must achieve. For example, the product specification may request building a new engine by the year 2010 that provides defined power amounts at different speeds, provides a defined amount of fuel economy, and meets legal requirements, such as emissions levels. The product specification may also indicate different environments for using the engine, such as in a marine application, a helicopter, and a vehicle. While these exemplary product specifications have been described, the product specification may relate to any type of product with varying specifications.

A customer may create a product specification using a web-based form provided by system 110. The form may include embedded terms that are supplied from dictionary database 130 to ensure consistent use of terminology. For example, rather than allowing a customer to type their own description of a product, the customer may be required to complete some or all of the product specification using drop-down menus that include terms from dictionary database 130. If the form does not include a term necessary to describe the requested product, an engineer may request adding one or more terms to dictionary database 130, as described below. The resulting form and product specification may create a technical contract between the customer and the manufacturer. The technical contract may be stored in, for example, knowledge database 140.

Next, system 110 may analyze the product specifications and create a technical summary (Step 220) by simulating or running modeled tests using the products specifications. Continuing with the example of developing an engine, additional technical details may be needed to develop the engine. For example, the engine may require different maintenance intervals based on the environment in which the engine is used. The technical summary may include additional specifications that the customer may review and approve. The technical summary may be stored in, for example, knowledge database 140.

System 110 may then identify prior products that have capabilities within a defined range of the product specifications (Step 230). For example, assume a customer requests an engine capable of developing 350 hp at 1,800 rpm. System 110 may search knowledge database 140, which may be built using standardized definitions from dictionary database 130, for any existing engines that have already been developed that meet these requirements. If an exact match exists for all of the requirements, the manufacturer may use the matching engine, saving costs on additional research and development. If there is another engine with capabilities within a defined range of the requested product specification (e.g., within plus or minus 10% of the power level, 315-385 hp at 1,800 rpm), system 110 may recommend the existing engine to the customer. If the customer requires the exact product specifications, modifying an existing product may still be more cost effective than designing a new product. Engineers may define the range within which to search, or the customer may define an acceptable variance range in the product specifications.

System 110 may also identify components of a product that are within a defined range of the product specifications. For example, although an engine as a whole may not be within the defined range of the customer's product specification, a component, such as an alternator, of an existing engine may be re-used. The technical details of simulations and tests used to identify products and components within a defined range of a customer's products specifications may be stored in, for example, journey database 150.

After identifying existing products, system 110 may create a performance specification (Step 240). The performance specification may refine the customer's product specification. For example, the performance specification may identify a particular application for an engine, such as a boat. An engineer reviewing the product specification may identify all of the additional specifications that are needed to create a product. Some of these additional specifications may be mandatory, others may be optional. An engineer may require that a customer select at least enough performance characteristics to develop the product. Moreover, customers may define additional requirements for developing the product, such as particular engineers that should develop the product, timeframes for completing different aspects of development, and a budget for the product.

A customer may provide any additional specifications and desired performance characteristics using, for example, a web-based form. An engineer may create the form for a customer based on the product specification that the customer submitted. The form may include drop-down selection menus based on existing products and common terminology in database dictionary 130. If a customer does not identify a desired performance characteristic, the engineer may choose it based on their personal experience or by searching for existing products. One consideration may be, for example, the cost of different configurations for a product, although customers and engineers may consider additional factors depending on the product and application.

The performance specification may also indicate to a customer the differences between the requested product specification and the performance capabilities of existing products, or modified existing products. For example, assume that a customer requested an engine with 350 hp at 1,800 rpm and other engines exist that are within a defined range of the requested power level. The performance specification may provide a comparison to the customer, including any changes in performance characteristics due to using an existing product. For example, a customer may have requested an engine that only consumes a defined amount of fuel. When a larger engine is selected to save costs, fuel efficiency may decrease. As a result of the increased fuel usage, an emissions level may also increase. The performance specification identifies all of the changes to a product specification that will occur due to conflicting requirements (e.g., requesting more power in an engine than may be delivered at a requested fuel economy) and due to recommending existing products rather than development of a new product. The performance specification may also include a cost analysis and a delivery time analysis for different configurations that a customer may choose. The performance specification may be developed by testing and simulating different product configurations. The comparison and results of simulations to create the performance specification may be stored in, for example, knowledge database 140. The technical details of simulations may be stored in, for example, journey database 150.

Next, system 110 may obtain approval of a performance contract based on the performance specification (Step 250). A customer may review the performance specification, and approve, modify, or reject the performance characteristics of the proposed product. A performance contract may capture the performance specifications that a customer approves. System 110 may provide the performance contract to a customer using, for example, a web-based application. A customer may view the status of a performance contract and approve any additional changes throughout product development. The performance contract may be stored in, for example, knowledge database 140.

Once a manufacturer and a customer agree on a performance contract, the manufacturer may proceed with developing the product according to the performance specification (Step 260). The customer may monitor the progress of the development, and review tests or simulations during development, using the web-based performance contract.

Next, the manufacturer may validate that the completed product meets the performance specifications, and store the validation results (Step 270). Validation of the product may include tests in a lab, simulations, and tests in the field of use (e.g., road tests for vehicles). The results of the test, such as whether an engine continued to operate properly, whether emitted emissions were within the identified range, and whether the desired fuel efficiency was achieved, may be stored in, for example, knowledge database 140. The details of the tests and simulations, such as the outside temperature and humidity, the duration of a test, the location of a test, and how the measuring instruments were calibrated, may be stored in, for example, journey database 150.

System 110 may provide a customer with a comparison between the original product specification, the performance specification, and the validated results of the product. The comparison may identify all of changes to the product and how the changes affected the cost and time of delivery for the product. The comparison, changes, and validation results may all be stored in knowledge database 140 using common terminology from dictionary database 130. As a result, the product may be stored in a way that allows system 110 to identify the product for subsequent use in other applications (as described in Step 230). In addition, system 110 may allow a customer to search the existing products and product specifications prior to requesting a new product.

Figure 3:
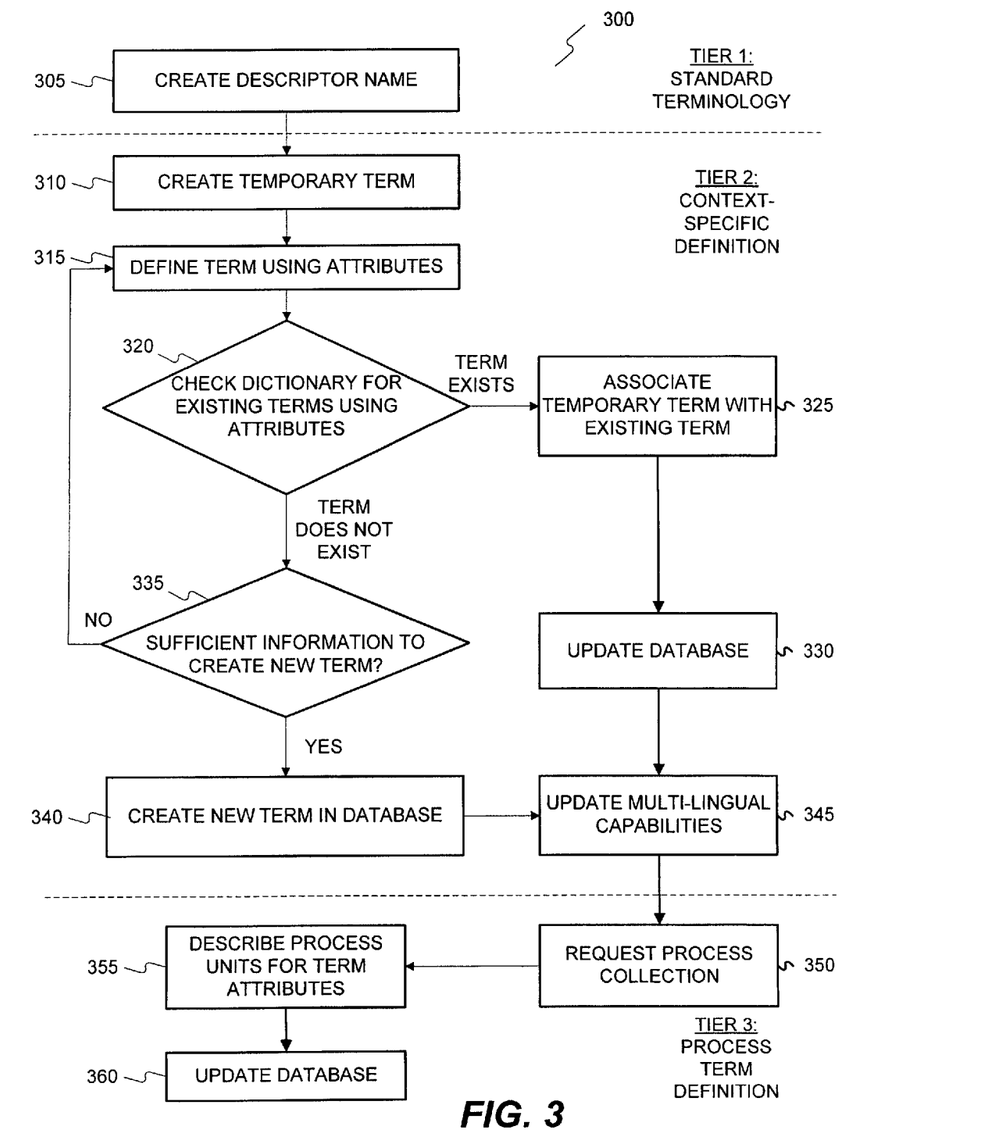
FIG. 3 is a flowchart illustration of an exemplary disclosed method of creating a data dictionary.

FIG. 3 illustrates an exemplary method 300 for building a dictionary that may be used in product management and validation. Method 300 may be invoked when an engineer or a customer wants to add a new term to dictionary database 130 using, for example, graphical user interface 400 (FIG. 4). The dictionary can be used, for example, to search for existing products and standardize terminology. Because the dictionary defines terms by their attributes, the dictionary may easily provide a thesaurus lookup for all related terms based on their attributes. Accordingly, engineers may use different terms in different languages to describe the same set of attributes, and data dictionary 130 may still provide an accurate search for all previously created products based on the attributes.

To add a term to dictionary database 130, the person requesting a new term may identify a descriptor name for a term (Step 305). The descriptor name may be a high-level name or category for a system that uses the term. For example, in the medical field, a descriptor name may be "arm" when creating a term related to a ligament in an arm. The descriptor name therefore forms a first tier that includes the broadest definition for a term. The first tier may include standard terminology for products of a company, as well as a serial number for the products. As another example, if a customer wants a new term directed to a component of a dozer, the customer may select a descriptor "dozer" from a drop-down menu. The descriptor names that are used in drop-down menus may be defined by a governance board. The governance board may include, for example, a team of engineers and salespersons who are familiar with the terms that a customer is likely to understand.

Next, a customer or engineer may create a temporary term (Step 310). With reference to FIG. 4, an exemplary temporary term 405 is "flux capacitance". The new term may begin the process of creating a second tier in data dictionary 130. The second tier may build on the first tier and the descriptor name to provide a context-specific definition. For example, the first tier may define a general product for the term (e.g., dozer), and the second tier may define a component of the product or an attribute of a component (e.g., an engine or engine acceleration).

The customer or engineer may then define the term using attributes of the term (Step 315). Attributes may include measurements and calculations for a term and the product that a term relates to. In the engineering field, exemplary attributes include a primary product category, a secondary product category, a type of measurement, a unit of measurement, a direction for the measurement, a medium, and a grouping, as described in more detail below.

System 110 may check dictionary database 130 for existing terms that match the temporary term using the attributes (Step 320). For example, if a user requested a term with attributes including a primary product of engine, a secondary product of camshaft, a measurement of length, and a unit of measurement in length in meters, system 110 may search for all other terms having these attributes. System 110 may search for an existing term with all of the same attributes or an existing term with similar terms. As an example of similar terms, assume that dictionary database 130 contains a term "manifold pressure." If the attributes of manifold pressure indicate a measurement of the pressure in an intake manifold measured in pounds per square inch (psi), a requested term with attributes measuring the pressure of a charge pipe may identify a matching term because the pressure at the charge pipe and manifold may be the same. Terms with similar attributes may match across different products to standardize terminology. Continuing with the example above, manifold pressure may share a definition for different engines in different products. Further, differences in the type of measurement (e.g., Fahrenheit or Celsius) may be automatically identified by system 110 to avoid creating duplicative terms. By searching for existing terms using attributes that define terms, consistent terminology can be maintained even using different languages.

If another term exists in dictionary database 130 with the same or similar attributes, system 110 may associate the temporary term with the existing term (Step 325). For example, rather than creating a new term in dictionary database 130, system 110 may update dictionary database 130 by listing the temporary term as a synonym of the existing term (Step 330). Alternatively, system 110 may notify a user that an existing term with attributes that match attributes of the temporary term already exists. The user may be notified of and requested to use the existing term. However, engineers can also use the different terms because a term is defined using attributes.

If, however, another term does not exist in dictionary database 130, system 110 may determine if a user has provided sufficient information to create a new term (Step 335). The determination may be made automatically by system 110 based on, for example, whether the user identified all of the attributes in a form. However, a governance board may also review the new term and its attributes to confirm that enough information has been provided to distinguish the new term from other existing terms. If sufficient information has not been provided, system 110 may prompt a user to further define the term using attributes. If sufficient information has been provided and optionally if the governance board approves the new term, the new term may be created in dictionary database 130 (Step 340).

Next, system 110 may update the multi-lingual capabilities of dictionary database 130. If a temporary term was associated with an existing term (Step 325) or if a new term was created (Step 340), system 110 may translate the temporary term or new term into all of the languages that data dictionary 130 supports (Step 345). The translated terms may also be stored in data dictionary 130. Because data dictionary 130 relies on attributes to define terms, inconsistencies in translation of the term itself does not cause incorrect definitions. Rather, a user in any language may search for a term based on the attributes of a term, and update data dictionary 130 with a temporary term according to their preferences.

A user may request a process collection 350 for any existing term. Process collections may allow a user to describe a process of how a particular term is measured or identified. When a user requests a process collection, system 110 or an engineer may search to determine if an existing process collection exists that will meet the needs of a user. Different users can create different process collections for the same term to capture the details of a process, such as a measurement. If a process collection containing the requested process units already exists, system 110 may notify the user of the existing process collection. If, however, the desired process collection does not exist, system 110 may create a new process collection. A governance board may also review the request for a process collection before approving it. System 110 may send an e-mail to the user that includes a link to a user interface for describing process units in a new process collection. The user who requested a new process collection may own it, and system 110 may require the user to login with a user name and password to modify the process collection.

Next, a user may describe process units for the term attributes (Step 355), building the third tier of data dictionary 130. A user may describe process units using a web-based user interface, such as user interface 500 of FIG. 5, described below. Process units may define how the attributes are determined. System 110 may prompt a user for the required process units based on the attributes used to define the term. Examples of process units include a source of how a measurement was provided, a condition, a unit of measure, a form, and an index, as described below.

For example, assume that a new term relates to a turbocharger in a vehicle. If the attributes defined in tier two relate to measuring temperature of air coming from a turbocharger, a source process unit may indicate whether the temperature was simulated, controlled, or actually measured and what type of instrument was used to take the measurement. Source may also indicate other ways for declaring a variable, such as a high shutdown (testing a product until a measurement reaches a defined value), low shutdown, high warning (testing a product until a measurement reaches a high warning level), low warning, or any other method for simulating, controlling, or obtaining a measurement. Continuing with the example of measuring air from a turbocharger, a condition process unit may indicate a specific condition for taking the measurement, such as whether the measurement was taken with the engine at idle, rated speed, or peak torque. A unit of measure process unit may be the same from attributes as defined in Step 315, but allows a user to indicate, for example, that the measurement was taken in Fahrenheit and converted to Celsius. A form process unit may indicate the form of measurement, such as an average, maximum, minimum, or correct measurement. An index process unit may indicate the number of locations for taking the same type of measurement (e.g., measuring two turbochargers). Although these exemplary process units have been described, other process units that define a method for calculating the attributes of a term.

Next, system 110 may update data dictionary 130 with the process units to complete the definition of a new term or association of a new term with an existing term (Step 360). System 110 may accept and store terms even if all process units are not described, or system 110 may require completion of all process units.

Figure 4:
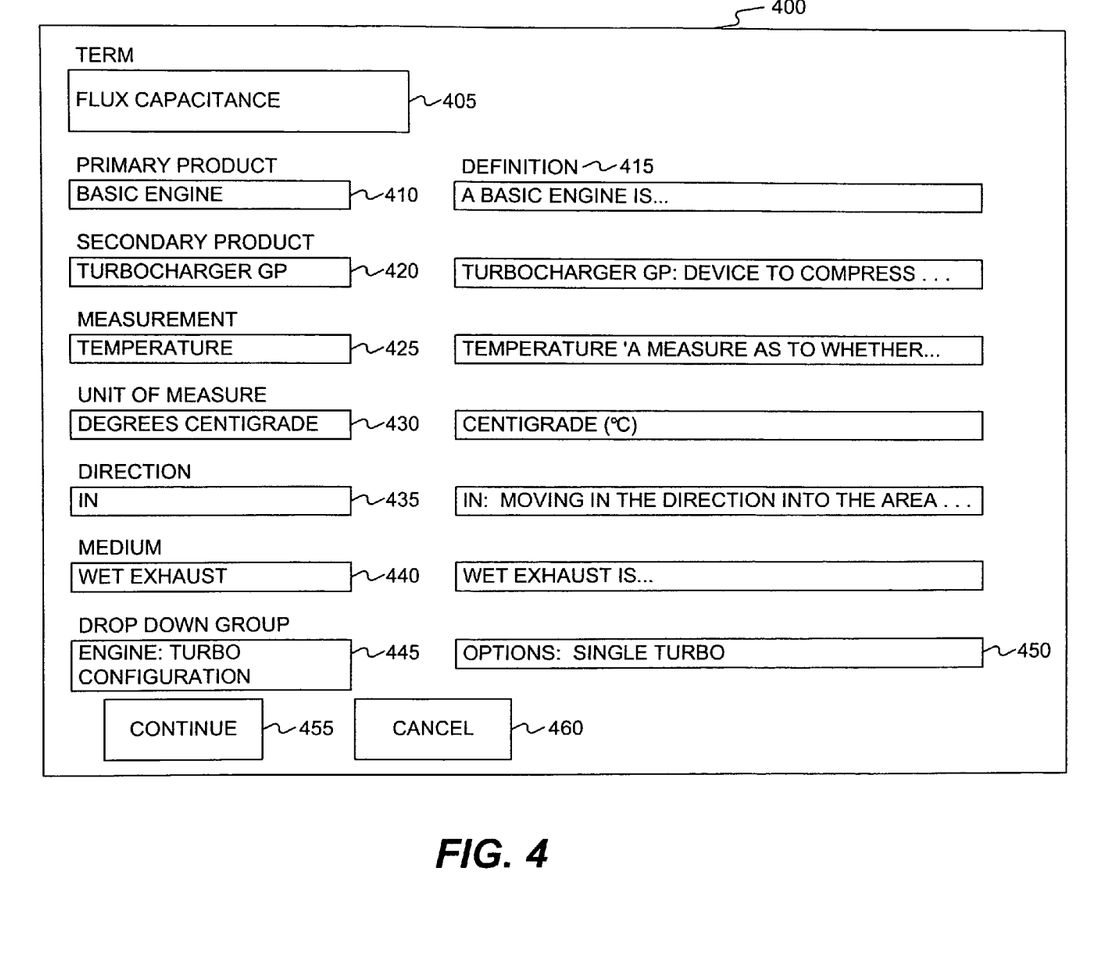
FIG. 4 is a schematic illustration of an exemplary user interface for creating a data dictionary.

FIG. 4 is a schematic illustration of an exemplary user interface 400 for creating a dictionary. A user, such as a customer or an engineer, may request adding a new term to data dictionary 130 as needed. For example, if a customer is creating a product specification using a form that does not include built-in terms sufficient to describe the new product, the customer may request a new term. User interface 400 may be a web-based form. System 110 may require a user to complete at least enough attributes and process units to adequately define the term. Once a user has completed the form, a user may select continue 455 to process the request for a new term, or cancel 460 to cancel the request.

A user may type their own temporary term 405, such as flux capacitance. Primary product 410 may be a drop-down menu including a list of all of a company's primary products. In the example of FIG. 4, a user selects a primary product 410 of "basic engine." The list of primary products may be approved by a governance board and identified in user interface 400. System 110 may provide a definition 415 for each attribute as a user selects the attribute from a drop-down menu. For example, when a user selects a primary product of "basic engine," a definition of "basic engine" is displayed in the corresponding definition field 415.

After a user selects the primary product, system 110 may populate secondary product drop-down menu 420 with components of a basic engine. In this example, a user selects "Turbocharger GP" as the secondary product. System 110 may then automatically provide a user with all of the types of measurements 425 for a turbocharger. A user may select, for example, temperature, which causes unit of measure field 430 to display a list of temperature measurements. Other types of measurements, such as capacitance, air flow, power, and torque, can also be used depending on the type of primary and secondary product for which system 110 performs a measurement.

A user may also indicate a direction 435 for taking the measurement, such as "in" to indicate that air temperature is being measured in the direction moving into the turbocharger. Other exemplary directions include above, below, after, before, and out. Medium 440 may indicate the medium that is being measured. Some components may include multiple mediums, such as a cooling element that includes a condenser with a fluid inside another fluid. When this occurs, the medium being measured should be identified. Examples of mediums include wet air, dry air, water, carbon dioxide, etc. Finally, a user may select a drop down group 445 to indicate the product configuration based on the attributes. For example, a user may select "engine: turbo configuration," which may cause system 110 to load options menu 450 that includes single turbo, twin turbo, quad turbo, twin turbo in parallel, etc. Other exemplary drop down groups include an engine fuel type (with related options of diesel, 87 octane, 91 octane, etc) and engine supply voltage (e.g., 12 volts or 14 volts). Although not illustrated, user interface 400 may also allow a user to enter any known translations of term 405 into other languages, or may automatically display translations that a user can modify.

Figure 5:
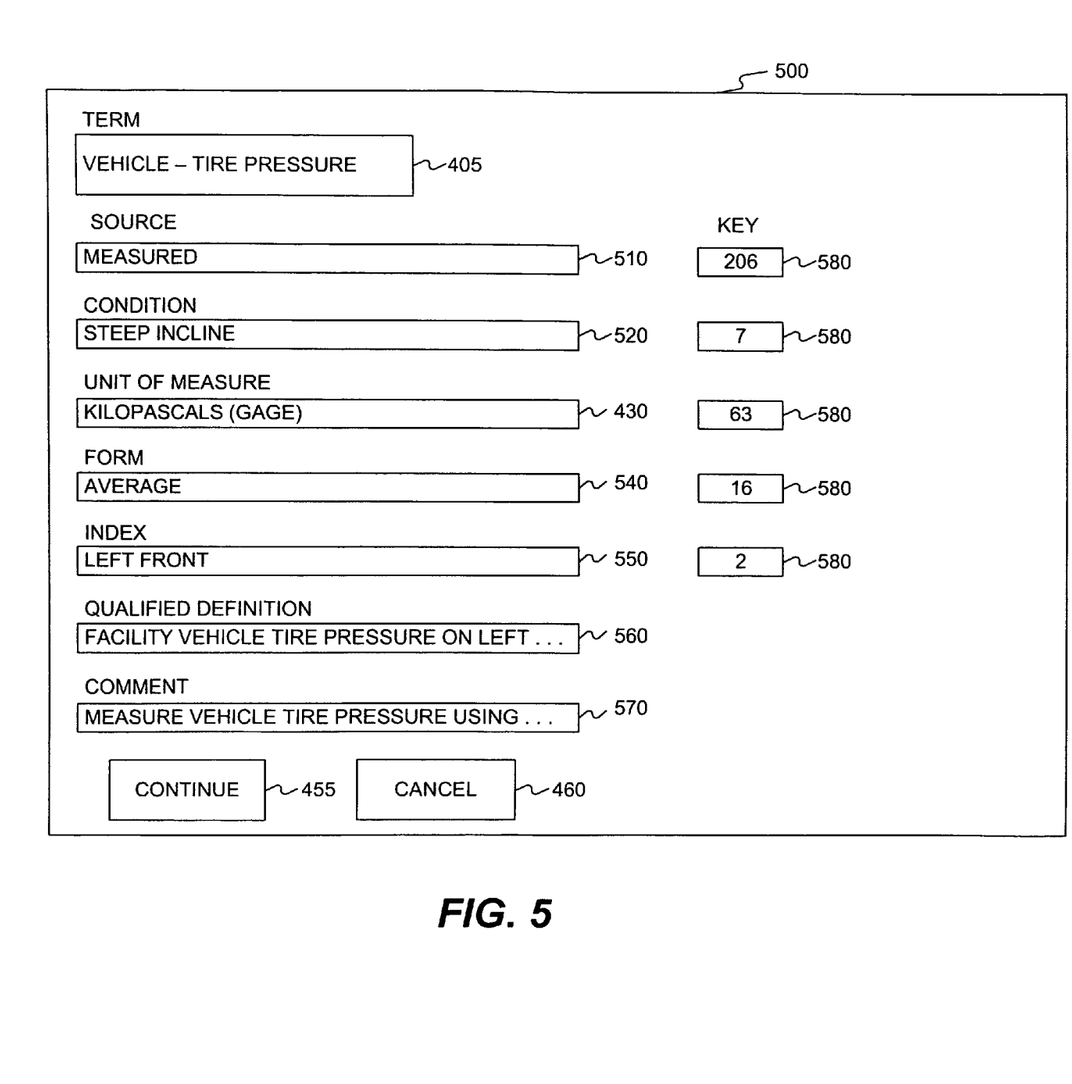
FIG. 5 is a schematic illustration of an exemplary user interface for creating a data dictionary and describing process units.

FIG. 5 is another schematic illustration of an exemplary user interface 500 for creating a dictionary and describing process units. User interface 500 may be a web-based form including drop-down menus. In this example, a user has identified term 405 "vehicle—tire pressure" for describing process units. Users may describe process units when adding a new term to dictionary database 130, or at any time that a user wants to identify a particular process to associate with an existing term.

A user may indicate a source 510 of "measured" to indicate that the vehicle tire pressure was measured; a condition 520 of "steep incline" to indicate that the vehicle was on a steep incline when the measurement was taken; and a unit of measure 430 of "kilopascals" taken using a gage. In this example, form 540 may indicate "average" to indicate the measured tire pressure is averaged. Index 550 may be "left front" to indicate that the left front tire pressure was measured. Qualified definition 560 may be automatically completed by user interface 500 from data dictionary. Comment 570 allows a user to indicate any additional information relevant to the process units, such as a particular type of instrument to use when taking the measurement. Although these exemplary process units have been described, additional process units may be used to define a process for a particular user. A user may request additional process units as needed to describe the process associated with their process collection.

Each drop-down field may indicate a key 580 for the associated field. For example, source 510 of measured may have a key 580 of "206," and condition 520 of steep incline may have a key of 7. Keys 580 may serve as a lookup in data dictionary 130. Rather than storing "measured" for each term having a source 510 of measured, data dictionary 130 may simply store "206." System 110 may match "206" to a list including the corresponding description, in this example "measured," when populating user interface 500. In this manner, data dictionary can reduce the amount of memory required for storage. Similarly, the fields used to define a term in user interface 400, such as term 405 and primary product 410, may have associated keys 580.

The disclosed systems and methods for managing and validating product development may utilize a data dictionary. The data dictionary may define terms using attributes and process units, allowing a customer or engineer to search for previously created products that may meet a customer's needs. Accordingly, additional costs associated with developing a new product may be avoided when an adequate product exists. Although data dictionary 130 has been described in the context of product development and validation, a dictionary consistent with the invention may be applied to any context requiring definition of interrelated technical terms. Moreover, although product development and validation has been described using data dictionary 130, any other dictionary may be used for product development methods that are consistent with the invention. It will be apparent to those skilled in the art that various modifications and variations may be made to the disclosed methods. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for managing and validating product development, comprising:
    obtaining a product specification for a product;
    identifying a prior product that has a capability within a defined range of the product specification;
    developing a performance specification based on the product specification and the identified prior product;
    obtaining approval for the performance specification;
    developing the product according to the performance specification; and
    validating that the product meets the performance specification.

2. The method of claim 1, further including:
    creating a technical summary for the product by analyzing the product specification;
    storing the technical summary in a first database;
    creating a performance contract based on the performance specification;
    and storing the performance contract in the first database, wherein
    obtaining approval includes obtaining approval for the performance contract.

3. The method of claim 2, further including:
    creating first test data by simulating a first modeled product, the first modeled product being configured based on the product specification;
    creating second test data by simulating a second modeled product, the second modeled product being configured based on the performance specification;
    creating third test data by testing the developed product;
    storing the first test data, the second test data, and the third test data in the first database, and
    storing technical details of the simulations and the testing in a second database.

4. The method of claim 3, further including providing a comparison between the first test data, the second test data, and the third test data.

5. The method of claim 1, further including:
    creating a technical contract including the product specification, the product specification indicating a desired performance characteristic for the product, and
    creating a performance contract including the performance specification.

6. The method of claim 1, further including using one or more web-based forms to:
    obtain the product specification;
    develop the performance specification; and
    obtain the approval.

7. The method of claim 6, further including building the web-based form using a data dictionary including standardized terms for the product.

8. A computer system for managing and validating product development, the computer system comprising a processor configured to:
    obtain a product specification for a product;
    identify a prior product that has capabilities within a defined range of the product specification;
    develop a performance specification based on the product specification and the identified prior product;
    obtain approval for the performance specification;
    develop the product according to the performance specification;
    validate that the product meets the performance specification; and
    output the results of the validation.

9. The computer system of claim 8, wherein the processor is further configured to:
    create a technical summary for the product by analyzing the product specification;
    store the technical summary in a first database;
    create a performance contract based on the performance specification; and
    store the performance contract in the first database, wherein
    obtain approval includes obtaining approval for the performance contract.

10. The computer system of claim 9, wherein the processor is further configured to:
    create first test data by simulating a first modeled product, the first modeled product being configured based on the product specification;
    create second test data by simulating a second modeled product, the second modeled product being configured based on the performance specification;
    create third test data by testing the developed product;
    store the first test data, the second test data, and the third test data in the first database, and
    store technical details of the simulations and the testing in a second database.

11. The computer system of claim 10, wherein the processor is further configured to provide a comparison between the first test data, the second test data, and the third test data.

12. The computer system, of claim 8, wherein the processor is further configured to:
    create a technical contract including the product specification, the production specification indicating a desired performance characteristic for the product, and
    create a performance contract including the performance specification.

13. The computer system of claim 8, wherein the processor is further configured to use a web-based form to:
    obtain the product specification;
    develop the performance specification; and
    obtain the approval.

14. The computer system of claim 13, wherein processor is further configured to build the web-based form using a data dictionary including standardized terms for the product.

15. A system for managing and validating product development, comprising;
    a memory;
    at least one input device;
    at least one central processing unit in communication with the memory and the at least on input device, wherein the central processing unit:
    obtains a product specification for a product;
    identifies a prior product that has a capability within a defined range of the product specification;

develops a performance specification based on the product specification and the identified prior product;

obtains approval for the performance specification;

develops the product according to the performance specification; and validates that the product meets the performance specification.

16. The system of claim 15, wherein the central processing unit further:

creates a technical summary for the product by analyzing the product specification;

stores the technical summary in a first database;

creates a performance contract based on the performance specification; and stores the performance contract in the first database, wherein obtains approval includes obtaining approval for the performance contract.

17. The system of claim 16, wherein the central processing unit further:

creates first test data by simulating a first modeled product, the first modeled product being configured based on the product specification;

creates second test data by simulating a second modeled product, the second modeled product being configured based on the performance specification;

creates third test data by testing the developed product;

stores the first test data, the second test data, and the third test data in the first database, and stores technical details of the simulations and the testing in a second database.

18. The system of claim 17, wherein the central processing unit further provides a comparison between the first test data, the second test data, and the third test data.

19. The system of claim 15, wherein the central processing unit further:

creates a technical contract including the product specification, the product specification indicating a desired performance characteristic for the product, and creates a performance contract including the performance specification.

20. The system of claim 15, wherein the central processing unit further uses one or more web-based forms to:

obtain the product specification;

develop the performance specification; and obtain the approval, wherein the web-based form uses a data dictionary including standardized terms for the product.

* * * * *